United States Patent
Hughes et al.

(10) Patent No.: US 7,454,779 B2
(45) Date of Patent: Nov. 18, 2008

(54) METHOD, SYSTEM AND COMPUTER PROGRAM FOR CONTROLLING ACCESS IN A DISTRIBUTED DATA PROCESSING SYSTEM

(75) Inventors: Jeremy P. J. Hughes, Winchester (GB); Richard P. Tate, Hambledon (GB)

(73) Assignee: International Business Machines Corporation, Armonk, NY (US)

(*) Notice: Subject to any disclaimer, the term of this patent is extended or adjusted under 35 U.S.C. 154(b) by 1350 days.

(21) Appl. No.: 10/098,676

(22) Filed: Mar. 15, 2002

(65) Prior Publication Data

US 2003/0018779 A1 Jan. 23, 2003

(30) Foreign Application Priority Data

Jul. 20, 2001 (GB) ................... 0117876.3

(51) Int. Cl.
*H04L 9/32* (2006.01)
(52) U.S. Cl. .............. 726/2; 726/1; 709/224; 709/225; 709/226; 707/6; 707/9; 707/10
(58) Field of Classification Search ........... 726/1–2, 726/26; 709/223, 224–225; 707/6, 9–10
See application file for complete search history.

(56) References Cited

U.S. PATENT DOCUMENTS

| | | | | |
|---|---|---|---|---|
| 6,263,364 B1* | 7/2001 | Najork et al. | ............... | 709/217 |
| 6,304,864 B1* | 10/2001 | Liddy et al. | ............... | 706/15 |
| 6,330,588 B1* | 12/2001 | Freeman | ............... | 709/202 |
| 6,530,024 B1* | 3/2003 | Proctor | ............... | 726/23 |
| 6,638,314 B1* | 10/2003 | Meyerzon et al. | ............... | 715/513 |
| 6,658,453 B1* | 12/2003 | Dattatri | ............... | 709/202 |
| 6,661,431 B1* | 12/2003 | Stuart et al. | ............... | 715/733 |

(Continued)

FOREIGN PATENT DOCUMENTS

WO WO 00/54458 9/2000

OTHER PUBLICATIONS

"Web Server Administrator's Guide to the Robots Exclusion Protocol", pp. 1-3, http://www.robotstxt.org/wc/exclusion-admin.html.

(Continued)

*Primary Examiner*—Kristine Kincaid
*Assistant Examiner*—Yin-Chen Shaw
(74) *Attorney, Agent, or Firm*—Jeanine Ray-Yarletts, Esq.; Steven M. Greenberg, Esq.

(57) ABSTRACT

Controlling access to information in a distributed data processing system. The distributed data processing system has a server, which stores the information and also further comprises a logging tool for creating a log file. The distributed data processing system also has a client computer comprising an application program for controlling a software agent. When the software agent requests information from the server, a process to identify the software agent is invoked. In response to the identification, all the requests from the identified software agent are stored in the log file and this data in the log file is analyzed. The data is also utilized in the process of monitoring the behavior of the identified software agent. In response to the monitoring process, at least one of a plurality of pre-defined rules is invoked, in order to control the behavior of the identified software agent.

15 Claims, 5 Drawing Sheets

U.S. PATENT DOCUMENTS

| | | | |
|---|---|---|---|
| 6,792,458 B1* | 9/2004 | Muret et al. | 709/224 |
| 6,826,594 B1* | 11/2004 | Pettersen | 709/203 |
| 2002/0116631 A1* | 8/2002 | Torii et al. | 713/200 |
| 2002/0156836 A1* | 10/2002 | Janosik et al. | 709/203 |
| 2002/0178169 A1* | 11/2002 | Nair et al. | 707/100 |
| 2004/0260722 A1* | 12/2004 | Allen et al. | 707/102 |
| 2005/0165778 A1* | 7/2005 | Obata et al. | 707/5 |

OTHER PUBLICATIONS

Spider Hunter: Learn to write cloaking scripts and track spiders, 5 pages http://www.spiderhunter.com.

Spider Central, 4 pages, http://www.john.php4hosting.com.

Extract from "Internet Agents: Spiders, Wandereres, Brokers and Bots" by Fah-Chun Cheong, New Riders Publishing, 1996, Chapter 1, pp. 3-7.

http://citeseer.nj.nec.com/43855.html, "Discovery of Web Robot Sessions Based on their Navigational Patterns", Pang-Ning Tan, Vipin Kumar, NEC Research Index, Mar. 6, 2001.

"Determining WWW User Agents from Server Access Log", Taketo Kabe, et al, Parallel and Distributed Systems: Workshops, Seventh International Conference on, 2000, Jul. 4-7, 2000, ISBN: 0-7695-0571-6.

"Detecting Attacks on Networks", by C. Herringshaw, Computer, Dec. 1997, vol. 30, Issu 12, ISN: 018-9162.

"A Survey of Intrusion Detection Techniques" by Teresa F. Lunt, Computers & Security, vol. 12, No. 4, 1993, ISSN: 0167-4048.

* cited by examiner

METHOD, SYSTEM AND COMPUTER PROGRAM FOR CONTROLLING ACCESS IN A DISTRIBUTED DATA PROCESSING SYSTEM

FIELD OF THE INVENTION

The present invention relates to access control in a distributed data processing system.

BACKGROUND OF THE INVENTION

In the World Wide Web (WWW) environment, client machines communicate with Web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows a developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer, which are applications running on a client machine, enable users to access information by specification of a link via the URL and to navigate between different HTML (web) pages.

When the user of the web browser selects a link, the client issues a request to a naming service to map a hostname (in the URL) to a particular network IP (Internet Protocol) address at which the server is located. The naming service returns an IP address that can respond to the request. Using the IP address, the web browser establishes a connection to a server. If the server is available, it returns a web page. To facilitate further navigation within a web site, a web page typically includes one or more hypertext references known as "anchors" or "links".

Today, there exists a vast amount of web pages whereby information within the web pages is dynamic, decentralised and diverse. For a user, the task of traversing the information can be very difficult and time-consuming. Therefore, there is a need for an efficient and automated method of traversing this information, so that a user is able to find relevant information amongst the vast amount of pages that exist.

A "robot" is a type of "agent" that is one solution to this problem. An agent is a computer program that is goal-oriented, that is, an agent tries to achieve some end result. For example, an agent could perform a task on behalf of a user and this is shown in FIG. 1, by using the example of the Internet. In FIG. 1, a user at a client computer (100) dispatches two agents via a controlling application program running on the client (100). "Agent 1" and "Agent 2" are dispatched over a network (110), which in this example, is the Internet. Since agents can be customised, the user can dispatch "Agent 1" to find a first piece of information held on a remote server (120), for example, the address of the nearest pizza restaurant. The user can also dispatch "Agent 2" to find a second piece of information, for example, the phone number of a taxi firm, which in this example is also held on the same remote server (120).

A robot is a special automated form of agent. The robot may simply react to changes in its environment, or when subjected to stimuli. "Web" robots are widely used for search and extraction of information held in web pages. They also have other uses, such as for personal shopping, whereby the robot collects information about products and prices from the WWW and presents this to the user. Robots can also be utilised in other mediums, such as, in databases.

Information gathering robots, typically used to retrieve unstructured information, such as text or images, are also known as "spiders", "crawlers" or "wanderers". These types of robots are most often used in highly interconnected data environments, such as the WWW. The term "crawling" is often used to denote the process of moving through an environment in a managed way. Specifically, an information gathering robot is a program that automatically explores the WWW by retrieving a document and recursively retrieving some or all of the documents that are linked to it. The robot has thus generated a web index of documents.

There are two main categories of crawling, namely, unfocussed and focussed. In unfocussed crawling, the robot is not looking for anything in particular and its main aim is to gather as much information as possible. This technique is often used by a "search engine", which searches through a web index in order to help locate information by keyword for example. Focussed crawling indicates that the robot is looking for a particular piece of information. This technique is used by a specialised robot such as a shopping robot.

More information about agents and web robots can be found in the book "Internet Agents: Spiders, Wanderers, Brokers and Bots" by Fah-Chun Cheong, New Riders Publishing, 1996.

Many robots are used for legitimate reasons, such as, for searching. Robots are often developed by well-known organisations, for example, search engine technology from Yahoo, Lycos, Google and so forth. However, when the first robots were developed, they had a reputation for sending hundreds or thousands of requests to each web site when gathering documents and this often resulted in the web site being overloaded. Although the development of robots has improved, some robots may still exhibit unfriendly behaviour, and it is this type of behaviour that an administrator may not be willing to tolerate.

Another reason for an administrator to want to block access to robots is to prevent them from indexing dynamic information. Using the example of searching again, many search engines will use information collected from a web site repeatedly, for weeks or months to come. Obviously, this feature is not much use if the web site is providing stock quotes, news, weather reports or any other information that will be out of date by the time a user finds it via a search engine. Other malicious robots are routinely used to systematically copy content assets from public web sites.

Currently, there are a number of methods of excluding robots from web sites. One example is the "Standard for Robot Exclusion" proposed by Martijn Koster and available at http://www.robotstxt.org/wc/wxclusion-admin.html. The protocol specifies a format for a file "Robots.txt", located in a web server's root directory. This file provides a means to request that a named robot limits its activities at a particular web site, or requests that a robot leave a web site. In FIG. 2, the first line in the robots.txt file (200) identifies that the exclusion policies refer to a robot called "Robot_1". The second line of the file (200) specifies that Robot_1 should not visit any URLs where "/england/london" is present after the host name in the URL, where a host name may take the form "www.corp.com". In the third line, the robot is also excluded from visiting any URLs where "/france/paris" is present after a host name.

However, the disadvantage with the Standard is that the exclusion policies may or may not be obeyed. This is because, although a robot may review the robots.txt file, it is the decision of the robot's creator as to whether or not the file is obeyed. In the case of malicious robots, the Standard is often ignored or misinterpreted, resulting in web sites being adversely affected by the actions of uncontrolled robots. If this occurs, a major challenge for administrators is to identify malicious robots and put in place manual methods for explicitly dealing with them promptly and effectively.

Some robots may be relatively simple to detect, since their activity may be concentrated into a short time period. Alternatively the robot may manifest itself as a form of "denial-of-service" or "ping attack". In this case a server is repeatedly hit by requests therefore limiting its capability to respond effectively. However, other robots use techniques so that they cannot be detected easily. One example is by hiding amongst the "noise" of traffic created by legitimate users of the system. Another example is by taking hours to complete a navigation of a system. In these cases, the manual and explicit exclusion of robots is difficult and unreliable.

Another method of controlling robots, or spiders in the case of this method, can be found at http://www.spiderhunter.com. The method described at this web site uses data collected when a user visits a web site, rather than using analysis of log files. To collect data, the method utilises three pieces of information, namely, an IP address associated with the user, the name of the spider being used and the file being requested. The method uses a neural net to check for new information and compares the new information against known information. For example, an IP address of a potential spider is checked to see whether it matches a known IP address of a spider. The neural net uses a baseline to determine whether the user is legitimate and uses weights to determine the likelihood of the user being a spider.

There are many disadvantages with using a neural net for detection of robots. For example, the output results from this method will only be as accurate as the amount of information input into it. Also, an administrator will not be able to modify the underlying detection method to suit their needs, rather, only the weights can be modified. This particular method also relies on the fact that a potential spider provides an IP address, however, if a spider enters a site through multiple proxies, it may be able to hide its IP address. Another web site offering a similar service is "Spider Central" which can be found at http://www.john.php4hosting.com.

Therefore there is a need for a method of automatically detecting and managing malicious robots, so that administrators can control access to their web sites, servers and systems more effectively.

SUMMARY OF THE INVENTION

According to a first aspect, the present invention provides a method of controlling access to information in a distributed data processing system having: a server for storing said information, in which said server further comprises a logging tool for creating a log file, and a client computer comprising an application program for controlling a software agent, in which said software agent requests said information from said server, said method comprising the steps of: identifying a software agent; in response to said identifying step, storing all requests from said identified software agent in said log file; in response to said storing step, analysing said log file; in response to said analysing step, monitoring behaviour of said identified software agent, and in response to said monitoring step, invoking at least one of a plurality of pre-defined rules to control said behaviour of said identified software agent.

Preferably, the information is represented within any number of a plurality of web pages, whereby each web page has a non-visible hypertext link inserted into their main bodies. Preferably, when a software agent requests one of a plurality of web pages, the agent is identified. The identifying step further comprises the steps of: dynamically generating a first unique identifier; dynamically inserting the first unique identifier into a non-visible link associated with one of a plurality of web pages, and determining whether the one of a plurality of web pages is associated with further of a plurality of web pages. In the preferred embodiment of the present invention, the software agent is a Web robot.

Preferably, if it is determined that the one web page is associated with further web pages, the first identifier is dynamically inserted into further non-visible links. The further non-visible links are of course associated with the further web pages. In the preferred embodiment of the present invention, the first identifier is a session ID, which will be described in more detail later on.

Preferably, if it is determined that the one web page is not associated with further web pages, the one page is firstly sent to the identified software agent. Then, the identified software agent requests any number of a plurality of links associated with the one web page from the server. In response to the request, the identified software agent extracts the any number of a plurality of links. Next, the identified software agent passes the any number of a plurality of links to the client application program. Once the client application program has received the links, it decides which of the links to display, based on its own logic. More preferably, the any number of links are displayed within a web browsing session running on the client computer.

Preferably, the analysing step of the method described above, further comprises the step of: identifying a first value associated with the any number of a plurality of web pages and a second value associated with the further of a plurality of web pages. Preferably, the monitoring step of the method described above, further comprises the steps of: utilising the first and second values to generate a third value, in which the third value is associated with the identified software agent, and utilising said third value and a fourth value associated with said all requests, to associate said first identifier and said identified software agent with a fifth value, in which said fifth value is associated with a probability.

More preferably, if the third value is not more than or equal to a first pre-determined threshold, the log file is analysed further. More preferably, if the fourth value is not more than or equal to a second pre-determined threshold, the log file is analysed further. In the preferred embodiment, the thresholds are pre-determined by an administrator.

Preferably, prior to the invoking step, the identified software agent is associated with a profile, whereby the profile comprises any number of a plurality of data fields unique to the identified software agent. Preferably, the invoking step further comprises the steps of: associating the any number of a plurality of data fields with the at least one of a plurality of pre-defined rules; determining whether a pre-defined response needs to be activated, and in response to a successful determining step, activating the pre-defined response. Advantageously, the administrator can configure the pre-defined responses to suit the environment.

Preferably, the log file further stores an address associated with a software agent and a name associated with the software agent. More preferably, at least one of the data fields is extracted from the log file. This is advantageous, in that the information captured about the software agent can now be re-used.

Preferably, a second unique identifier is also generated and the inserted into any non-visible link. In the preferred embodiment of the present invention, the first identifier is a page ID, which will be described in more detail later on. Preferably, the distributed data processing system further comprises an application server. In the preferred embodiment, the application server processes the techniques.

Preferably, the at least one of a plurality of pre-defined rules control a plurality of thread priorities associated with the server, in which at least one of a plurality of threads is associated with a software agent. Advantageously, the preferred embodiment ensures that a robot does not consume too much of a system's resources at the expense of other users.

According to a second aspect, the present invention provides a system for controlling access to information, for use in a distributed data processing system, said distributed data processing system comprising: a server for storing said information, in which said server further comprises a logging tool for creating a log file, and a client computer comprising an application program for controlling a software agent, in which said software agent requests said information from said server, said system for controlling access comprising: means for identifying a software agent; means, responsive to said identifying means, for storing all requests from said identified software agent in said log file; means, responsive to said storing means, for analysing said log file; means, responsive to said analysing means, for monitoring behaviour of said identified software agent, and means, responsive to said monitoring means, for invoking at least one of a plurality of pre-defined rules to control said behaviour of said identified software agent.

According to a third aspect, the present invention provides a distributed data processing system comprising: a server for storing said information, in which said server further comprises a logging tool for creating a log file, and a client computer comprising an application program for controlling a software agent, in which said software agent requests said information from said server, and a system for controlling access to information, as described above.

According to a fourth aspect, the present invention provides a computer program product comprising computer program code stored on a computer readable storage medium which, when executed on a computer, performs the method as described above.

BRIEF DESCRIPTION OF THE DRAWINGS

The present invention will now be described, by way of example only, with reference to preferred embodiments thereof, as illustrated in the following drawings.

DETAILED DESCRIPTION OF THE INVENTION

Figures 1, 2:
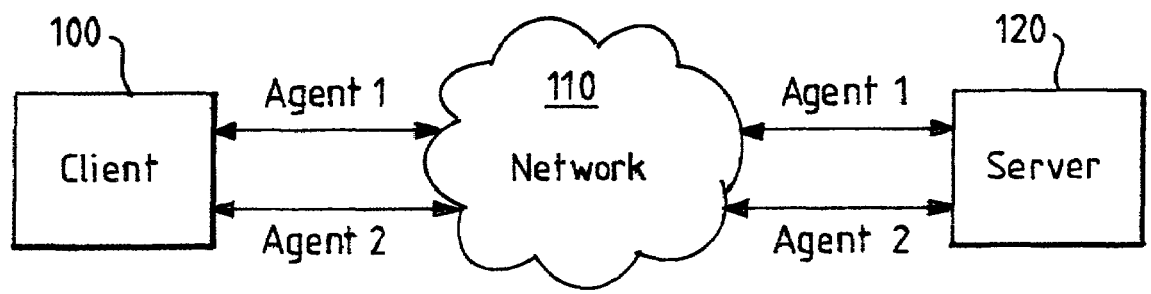
FIG. 1 shows a prior art overview of a distributed data processing system utilising agents.
FIG. 2 shows a prior art representation of a file for exclusion of web robots.
Figure 3:
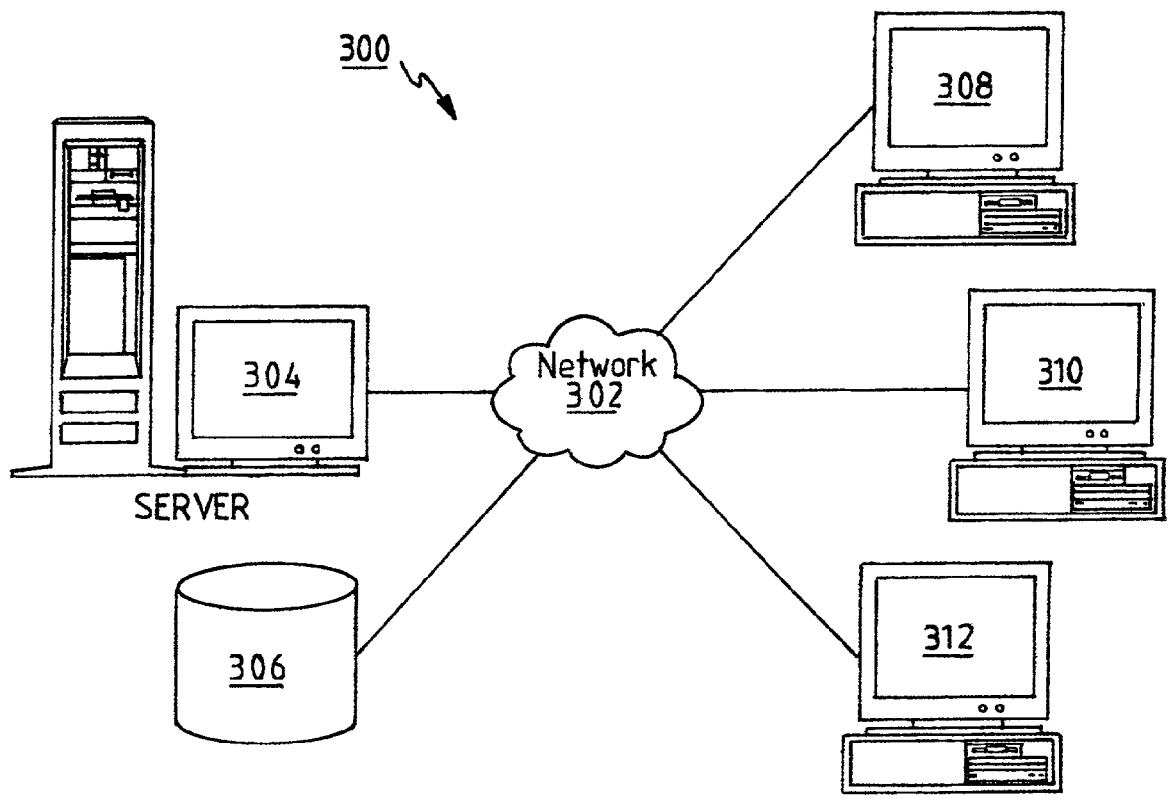
FIG. 3 shows a prior art distributed data processing system in which the present invention may be implemented.

FIG. 3 shows a pictorial representation of a distributed data processing system in which the present invention may be implemented. Distributed data processing system 300 comprises a number of computers, connected by a network 302.

Server 304 is preferably a web server and is connected to network 302 along with storage unit 306 and clients 308, 310 and 312. In the depicted example, distributed data processing system 300 is the Internet, with network 302 representing a world-wide collection of networks and gateways that use the transmission control protocol over internet protocol (TCP/IP) suite of protocols to communicate with one another.

Generally, the present invention provides a technique for identifying the existence of a robot and tracking its behaviour on a web site. Once identified, a management process is put into place to either control the robot or remove it entirely. The present invention will be described under three main categories:
1. A robot activity logging technique
2. A robot activity monitoring technique
3. A robot management technique 1. A Robot Activity Logging Technique The aim of this logging technique is to facilitate the identification of robot activity on a web site. It should be understood that the term "robot" encompasses spiders, wanderers etc in this description.

Figure 4:
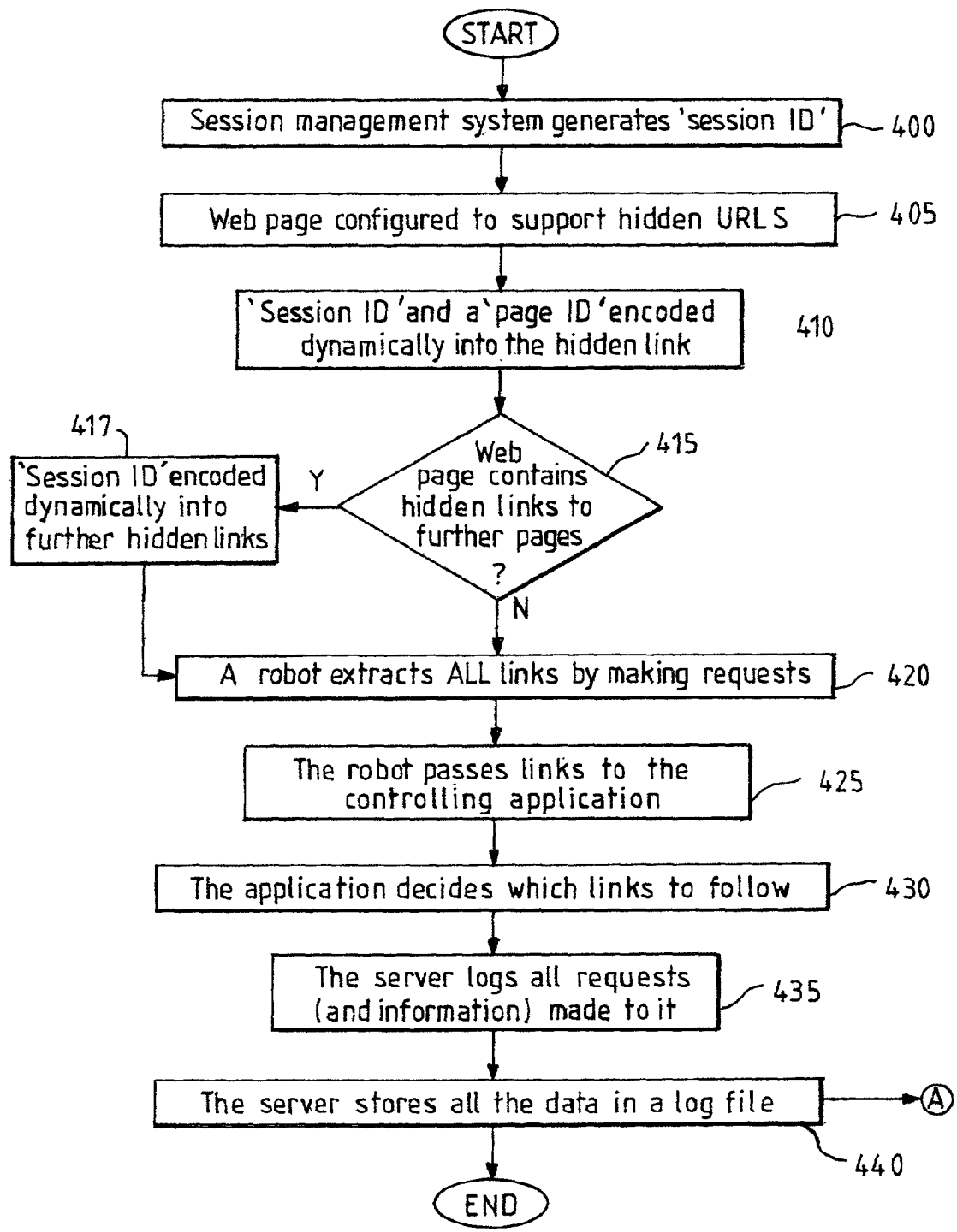
FIG. 4 is a flow chart showing the operational steps involved in the robot activity logging technique, according to the present invention.

This technique will now be described with reference to FIG. 4. The pre-requisite for this logging technique is a "session ID". A session ID is a unique identifier as it has a different value each time a web browser is re-started. Preferably, web pages supporting this technique are generated dynamically and make use of URL-rewriting session ID management. A session ID is generated (step 400) by a session management system located in the server (304). It should be understood that although dynamic session IDs are used in the preferred embodiment, any other form of unique identifier may be used.

Preferably, all web pages on a web site supporting this technique have a prior art non-visible hypertext link inserted (step 405) into their main bodies. This is called a "hidden link". A hidden link is a URL that cannot be seen on the web page by a user, that is, there is no hypertext visible. However, a valid hypertext ("HREF") reference is present so that a search engine, for example, can find it.

Preferably a session ID is dynamically inserted into a hidden link when a web page is generated. This resulting information is preferably stored in a log file. Preferably, two sets of information are added (step 410) to the hidden link, namely:
1. A "page ID"—this is a unique identifier for every web page on a web site. In the examples below it is represented by a string of numbers.
2. A "session ID"—as described above, this identifier is dynamically inserted into the hidden link when the web page is generated. In the examples below it is represented by a string of numbers.

Both sets of information are encoded into the hidden link, so that a web application server or a web server plug-in can extract the information when required.

An example of the HREF attribute is provided below:
<A HREF="/valid_dir/valid_page0012x1234.html"></A>

In this example, "0012" is a page ID and "1234" is a session ID. Note that a session ID or page ID can either be added to the hidden link as a standard parameter, for example (using a session ID):

http://www.mysite.com/blindlink15?sessionID=1234 or, the identifiers could be embedded within the page name, for example (using a session ID):

http://www.mysite.com/blindlink15_1234.html.

Referring to the addition technique, advantages include the fact that individual robots can be tracked. More specifically, the client application program that controls a robot is tracked. Referring to the embedding technique, the advantage is that session IDs will not be lost if parameters are stripped from a URL. However, the web server or application server (which is located below the web server in the system architecture) will need to do more work in order to extract the information in the first place. The advantage of associating session IDs with URLs, rather than using cookies on a client computer to generate a session ID, is that robots often ignore cookies.

Sometimes robots are configured to ignore hidden links that point to a web page with no on-screen text and therefore these robots cannot be logged. The HREF attribute will not contain any visible text and may look like this:

<A HREF="/abc.html"></A>

Preferably, to overcome this problem one or more characters, which are set to the background colour of that web page, are used between HTML tags. The HREF attribute may look like this:

<set foreground to be the same as background><A HREF="/abc.html">abc/A><next foreground colour>

Therefore, the robot is forced to follow this hidden link and can then be logged.

Preferably, if other links on the web page lead to further dynamic pages, that is, a positive result to step 415, these links are similarly encoded (step 417) with the same session ID, but not with the same page ID. This is because the further dynamic pages are navigated to within the same session. However, each further dynamic page will be associated with a unique page ID. In this description, a web page containing a hidden link is termed a "hidden page" and a web page identified by a hidden link is termed a "blind page".

The hidden link is not visible on a client web browser and therefore it is unlikely that typical users can navigate to a web page that the hidden link refers to by using standard methods. It can therefore be assumed that anything requesting the web page is extracting the hidden link by a different means, such as by page parsing which is typically used by spider systems. In this process, the spider utilises the HTML source for the web page which a web browser uses to display content, and extracts HTML code that represents links to other web pages.

Referring back to FIG. 4, if there are no further links to further web pages, that is, a negative result to step 415, the full web page is downloaded to the robot and it will then extract (step 420) all links on the page, including the hidden links. It will then pass (step 425) all the links back to the controlling client application program. This client application program will then decide (step 430) on which links to follow based on its own logic. For example, if the program specified to the robot that it should only return links relating to shopping, the program may decide to follow only these links.

Preferably, the web server continuously logs (step 435) all HTTP requests made to it and this information is stored (step 440) in a log file. A HTTP request may be structured as shown below:

http://www.mysite.com/blindlink15?sessionID=1234

Preferably, the log file also stores the IP address of the requester and the name of the user, that is, a "user_agent" field.

Figure 5:
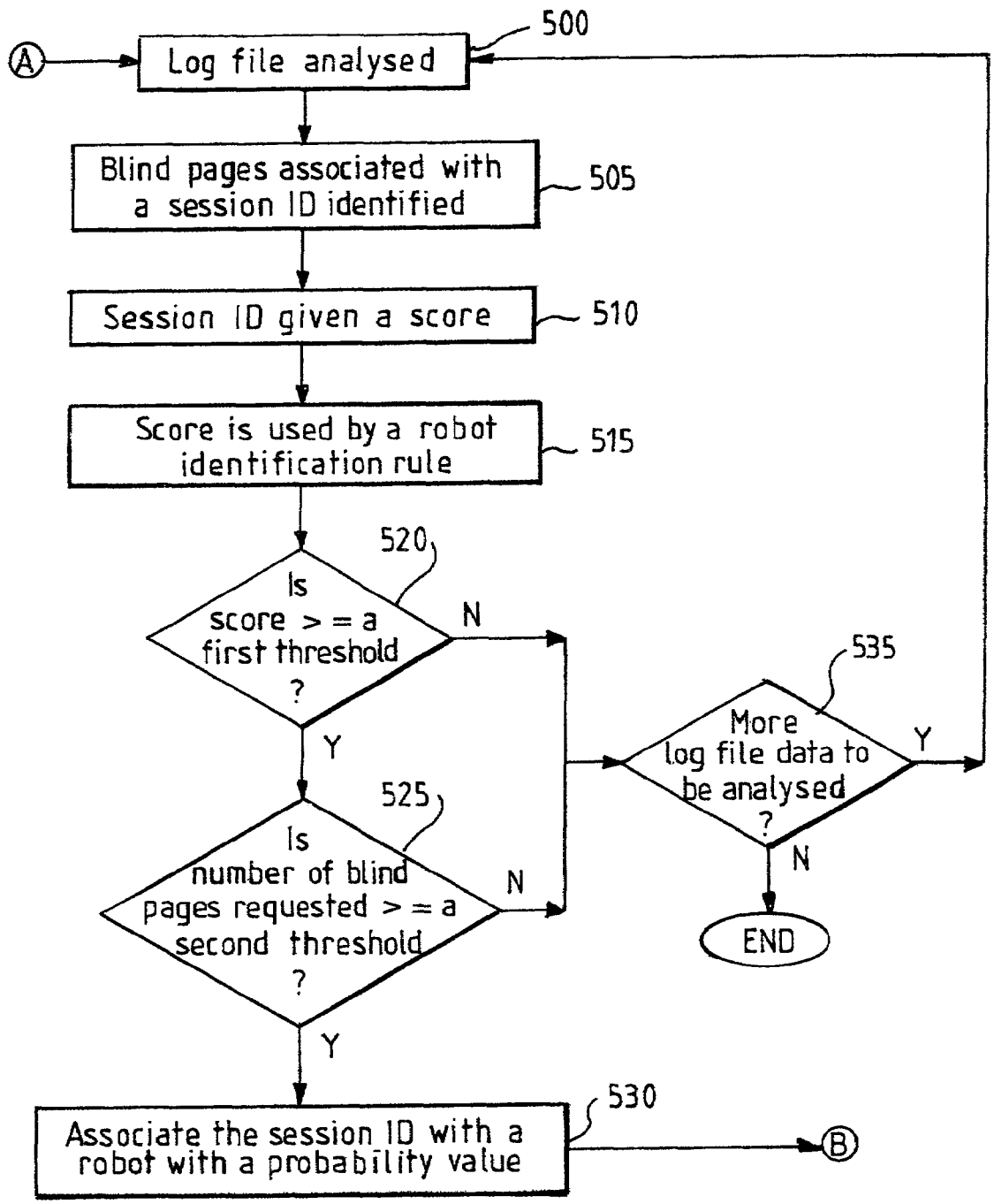
FIG. 5 is a flow chart showing the operational steps involved in the robot activity monitoring technique, according to the present invention.

At step 440, the logging technique may either finish if no more processing is to be done, or, at "A", the processing passes to FIG. 5.

2. A Robot Activity Monitoring Technique

The aim of this monitoring technique is to track the behaviour of a robot on a web site.

This technique will now be described with reference to FIG. 5. The pre-requisite for this technique is a web server log file containing data captured by the activity logging technique as described above. The log file is input into the processing at "A".

In this technique, firstly a robot identifier is automatically determined by analysing (step 500) the log file to identify (step 505) all blind pages associated with a session ID. In practice, this may occur by parsing the HTTP requests stored in the log file in order to extract the values relating to the blind pages and session IDs. For example, for a given session ID "1234", the blind pages requested are "0012", "0034", "0045", "0027", "0067", "0094", "0101", "0002", "0032", "0039".

The session ID is then given (step 510) a score, termed a "robot score". The score is calculated by taking the total number (x) of blind pages requested as a percentage of the total number (y) of hidden pages requested.

$$\text{ROBOT\_SCORE} = \frac{x \text{ Blind Pages}}{y \text{ Hidden Pages}} * 100$$

Once a robot score has been calculated, it is utilised (step 515) by a "robot identification rule", which is used to establish whether or not a session ID can be associated with a robot with a probability value. The rule takes the form:

IF ROBOT_SCORE>=THRESHOLD1 AND NUMBER_OF_REQUESTS>=THRESHOLD2 THEN ASSOCIATE SESSIONID WITH ROBOT WITH PROBABILITY_P

In the above rule, the "NUMBER_OF_REQUESTS" parameter represents the total number of requests received during the monitored session. That is, the requests for the hidden pages, blind pages and any other pages requested. "THRESHOLD1" and "THRESHOLD2" are pre-defined values set by an administrator. The purpose of the thresholds is to reduce the probability of false alerts. For example, if it is realised that a human user shows signs of robot activity, such as, if that user makes a large number of requests for hidden pages, an administrator can vary THRESHOLD2 (e.g. by raising the pre-defined value for THRESHOLD2). Therefore, the monitoring process is flexible enough to be implemented in different environments.

The first threshold is based on the hypothesis that the probability of a typical user requesting every blind page when viewing a hidden page is extremely small, whereas a robot system is much more likely to exhibit this behaviour. THRESHOLD1 is therefore set to a high value, such as, "98". If the requirements for the first threshold are met, that is, a positive result to step 520, then processing passes to the second threshold.

The second threshold acts as a sanity check, whereby the meaningfulness of the robot score increases as the number of requests made increases. THRESHOLD2 is therefore set to a minimum value, such as, "10". If the requirements for the second threshold are met, that is, a positive result to step 525, then processing passes step 530.

If the requirements for the two thresholds are not met, processing passes to step 535. In this step, if more information is to be analysed, that is, a positive result to step 535, processing passes once more to step 500. However, if there is no more information to be analysed, that is, a negative result to step 535, processing finishes.

Referring back to step 530, a probability value (P) is simply calculated as shown below:

$$P=\text{ROBOT\_SCORE}/100$$

The probability value represents the likelihood of the monitored behaviour being that of a robot. The range of values is from 0 to 1. That is, a malicious robot will have a higher probability value than a non-malicious robot.

By using a rule-based paradigm it is easy to add extra elements to the robot monitoring process. For example, the time taken between requests for a hidden page and its associated blind page may be included as another feature within the rule. This flexibility allows the rules to be optimised and enhanced by an administrator based on trials and experience, if desired.

The monitoring technique can be applied in a number of ways. Preferably, the primary factor determining the way in which the technique can be used is the rate at which data in the log file is captured. If a web site is extremely popular, many thousands of requests may be captured every second and this obviously poses a problem for a process designed to analyse this information and produce a timely response. In this case, it is preferred to take periodic "snapshots" of the log file, whereby each snapshot contains a defined number of log entries. Then, the snapshots are processed and the results are added to a historical database recording the data.

Figure 6:
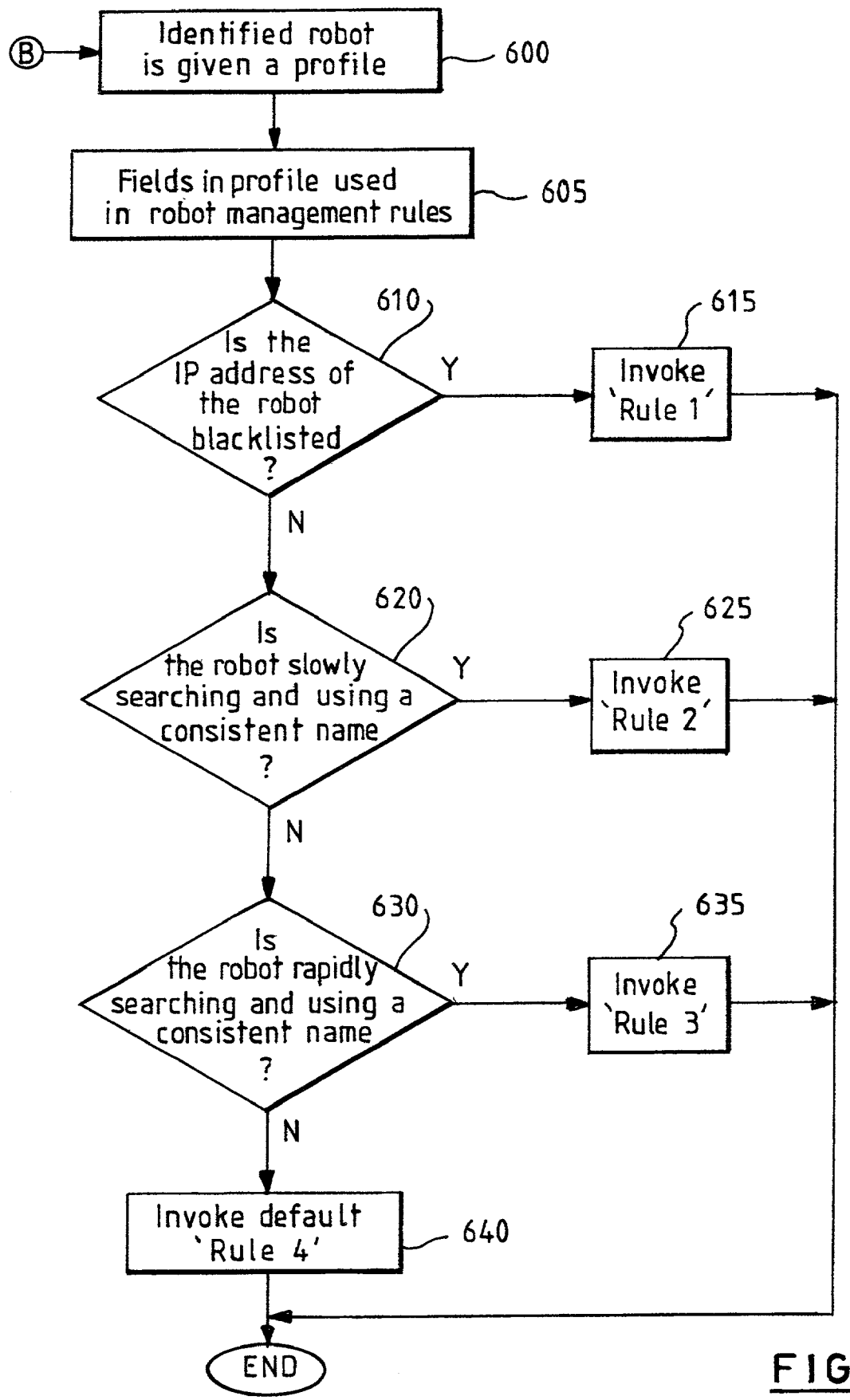
FIG. 6 is a flow chart showing the operational steps involved in the robot management technique, according to the present invention.

Finally, if the output of the monitoring technique is that a session ID becomes associated (step 530) with a robot with a probability value, then processing passes to FIG. 6 at "B" and the next stage of robot management is performed.

3. A Robot Management Technique

The aim of this management technique is to proactively manage the presence of robots on a web site using pre-defined rules and responses based on robot behaviour patterns.

This technique will now be described with reference to FIG. 6. A pre-requisite for this technique is the identification of one or more robots via the activity logging technique and the data gathered about a robot's behaviour via the activity monitoring technique described above. The data associated with the identified robot and its behaviour is input into FIG. 6 at "B".

Preferably, each robot detected on a system by the aforementioned monitoring technique is given (step 600) a dynamically generated "profile". The profile contains information about the behaviour and characteristics of a particular robot, and includes fields such as:
1. Current probability—that is, the value of "P" which is calculated as described above.
2. The time passed since the first detection of the robot
3. The number of unique hidden pages visited—a value is calculated which is a percentage of the total number of hidden pages
4. User agent—this is extracted from an HTTP request and can either be "consistent", that is, the same name is used for every request in which case the name is recorded, or "variable".
5. An IP address Some of the fields can be constructed using data extracted from the log file, in this example: the number of unique hidden pages visited, user agent name and the IP address. The profile of a particular robot is used to determine how to respond to that robot's presence on a web site. A hierarchical series of "management rules" are defined to control this process and utilises (step 605) the fields. For example:

IF IP_ADDRESS IN BLACKLIST THEN MANAGEMENT_RESPONSE=1

ELSE

IF PAGES_VISITED<=10% AND TIME_SINCE_DISCOVERY>5 MINUTES AND USER_AGENT=CONSISTENT THEN MANAGEMENT_RESPONSE=2

ELSE

IF PAGES_VISITED>10% AND TIME_SINCE_DISCOVERY<=5 MINUTES AND USER_AGENT=CONSISTENT THEN MANAGEMENT_RESPONSE=3

ELSE

MANAGEMENT_RESPONSE=4

In the above example, the value defined for the "MANAGEMENT_RESPONSE" parameter indicates the response to be activated for managing a robot's presence on a web site.

In the example above, if the first rule is obeyed, that is, a positive result to step 610, the system activates (step 615) response "1". Rule 1 determines whether a robot is associated with a known blacklisted IP address. That is, an IP address of a potential robot is compared to a stored list of known IP addresses of blacklisted robots. If a match occurs, the response may simply be to deny any further requests from the robot, which can of course be identified via its session ID. If the first rule is not obeyed, that is, a negative result to step 610, processing passes to step 620.

In this step, the second rule deals with robots, which are slowly searching a web site. That is, the potential robot has searched less than or equal to ten percent of the web pages within a web site over a time period of more than five minutes. The potential robot in this example is additionally using a consistent user agent name. This would be typical of a robot, since on the whole, many individual users would use different user agent names.

If the second rule is obeyed, that is, a positive result to step 620, the system activates (step 625) response "2". An example of a response that would be initiated for these types of robots may be to do nothing other than to continue to monitor their behaviour. If the second rule is not obeyed, that is, a negative result to step 620, processing passes to step 630.

In this step, the third rule handles robots that are rapidly trawling through a web site. That is, the potential robot has searched more than ten percent of the web pages within a web site, over a time period of less than or equal to five minutes. The potential robot in this example is also using a consistent user agent name. These types of robot may be a potential hazard to a web site by consuming too many resources. If the third rule is obeyed, that is, a positive result to step 630, the system activates (step 635) response "3".

One example of this response may be to withhold web pages from a requesting robot—if the session ID associated with that robot is stored, then any further requests made by that robot using the same session ID can be denied. If the third rule is not obeyed, that is, a negative result to step 630, processing passes to step 640.

In this step, the response "4" serves as a default selection or catch-all rule. The purpose of this rule is to deal with all robots not covered by the other rules. After each system response (steps 615, 625, 635, 640) processing finishes. Of course, FIG. 6 is one example of a set of management rules. It should be understood that many other configurations of rules could be applied, as desired.

Advantageously, the management rules may be as simple or complex as required. Factors to be considered by an administrator when determining the rules, include the nature of a web site, the web site's susceptibility to robots or the perceived dangers or problems that the robots may provoke. Preferably, the logging, monitoring and management techniques are implemented on an application server.

In a further embodiment of the present invention, the management responses could be used to control the amount of server processing time allocated to individual robots. For example, a response may establish that:

"If a server is busy, reduce the priority of the thread controlling a robot's HTTP requests"

Alternatively, the response could establish that:

"If a server is not busy, then the priority of the thread controlling a robot's HTTP requests is raised"

Advantageously, the preferred embodiment ensures that a robot does not consume too much of a system's resources at the expense of other users. However, during slack times, such as when a server load is at its lowest, robots could be positively encouraged by minimising the response time to their HTTP requests. The preferred embodiment will therefore encourage "positive feedback" for intelligent systems. An example of an intelligent system is a robot that is able to detect when it is allowed to navigate a web site. An intelligent system could therefore identify the best time to traverse a specific web site based on the response time from a server and will only navigate at optimum periods.

Preferably, a higher-level "global" set of management rules is used to control all robots using a web site. For example, these rules determine the number of threads that can be allocated to robots at any given time, the default priority allocated to robot threads and so forth.

It will be apparent from the above description that, by using the techniques of the preferred embodiment, an end-to-end process for automatically protecting a system from malicious robots is achieved, whilst also providing flexibility in the way in which the process can be implemented. The present invention is also advantageous in that the amount of server processing time allocated to individual robots can be controlled.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

Although the present invention and its advantages have been described in detail, it should be understood that various changes, substitutions and alterations can be made herein without departing from the spirit and scope of the invention as defined by the appended claims.

The invention claimed is:

1. A method of controlling access to information in a distributed data processing system having:

a server for storing said information, wherein said server further comprises a logging tool for creating a log file, and a client computer comprising an application program for controlling a software agent, wherein said software agent requests said information from said server, said method comprising the steps of:
identifying a software agent;
in response to said identifying step, storing all requests from said identified software agent in said log file;
in response to said storing step, analysing said log file;
in response to said analysing step, monitoring behaviour of said identified software agent, and in response to said monitoring step, invoking at least one of a plurality of pre-defined rules to control said behaviour of said identified software agent, wherein said distributed data processing system further comprises an application server.

2. A method of controlling access to information in a distributed data processing system having:

a server for storing said information, wherein said server further comprises a logging tool for creating a log file, and a client computer comprising an application program for controlling a software agent, wherein said software agent requests said information from said server, said method comprising the steps of:
identifying a software agent;
in response to said identifying step, storing all requests from said identified software agent in said log file;
in response to said storing step, analysing said log file;
in response to said analysing step, monitoring behaviour of said identified software agent, and in response to said monitoring step, invoking at least one of a plurality of pre-defined rules to control said behaviour of said identified software agent, wherein
said information is represented within any number of a plurality of web pages, each of said any number of a plurality of web pages comprising a non-visible link.

3. The method according to claim 2, wherein a software agent requests one of a plurality of web pages, said identifying step further comprises the steps of:
dynamically generating a first unique identifier;
dynamically inserting said first unique identifier into a non-visible link associated with said one of a plurality of web pages, and determining whether said one of a plurality of web pages is associated with further of a plurality of web pages.

4. The method according to claim 3, wherein:
upon said determining step being successful, said first identifier is dynamically inserted into further non-visible links.

5. The method according to claim 3, wherein upon said determining step not being successful, said identifying step further comprises the steps of:
sending said one of a plurality of web pages to said identified software agent;
in response to said sending step, requesting, from said server by said identified software agent, any number of a plurality of links associated with said one of a plurality of web pages;
in response to said requesting step, extracting, by said identified software agent, said any number of a plurality of links;
in response to said extracting step, passing, by said identified software agent, said any number of a plurality of links to said client application program, and in response to said passing step, determining, by said client application program, which of said any number of a plurality of links to display.

6. The method according to claim 5, wherein said any number of a plurality of links is displayed within a web browsing session running on said client computer.

7. A method of controlling access to information in a distributed data processing system having:
a server for storing said information, wherein said server further comprises a logging tool for creating a log file, and a client computer comprising an application program for controlling a software agent, wherein said software agent requests said information from said server, said method comprising the steps of:
identifying a software agent;
in response to said identifying step, storing all requests from said identified software agent in said log file;
in response to said storing step, analysing said log file;
in response to said analysing step, monitoring behaviour of said identified software agent, and in response to said monitoring step, invoking at least one of a plurality of pre-defined rules to control said behaviour of said identified software agent, wherein
said analysing step further comprises the step of:
identifying a first value associated with said any number of a plurality of web pages and a second value associated with said further of a plurality of web pages.

8. The method according to claim 7, wherein said monitoring step further comprises the steps of:
utilising said first and second values to generate a third value, wherein said third value is associated with said identified software agent, and utilising said third value and a fourth value associated with said all requests, to associate said first identifier and said identified software agent with a fifth value, wherein said fifth value is associated with a probability.

9. The method according to claim 8, wherein upon said third value being not more than or equal to a first pre-determined threshold, said log file is analysed further.

10. The method according to claim 8, wherein upon said fourth value being not more than or equal to a second pre-determined threshold, said log file is analysed further.

11. The method according to claim 7, wherein said identified software agent is associated with a profile, said profile comprising any number of a plurality of data fields unique to said identified software agent, wherein said invoking step further comprises the steps of:
associating said any number of a plurality of data fields with said at least one of a plurality of pre-defined rules;
determining whether a pre-defined response needs to be activated, and in response to a successful determining step, activating said pre-defined response.

12. The method according to claim 11, wherein said log file further stores an address associated with a software agent and a name associated with said software agent.

13. The method according to claim 12, wherein at least one of said any number of a plurality of data fields is extracted from said log file.

14. The method according to claim 2, wherein a second unique identifier is generated and further inserted into a non-visible link.

15. A method of controlling access to information in a distributed data processing system having:
a server for storing said information, wherein said server further comprises a logging tool for creating a log file, and a client computer comprising an application program for controlling a software agent, wherein said software agent requests said information from said server, said method comprising the steps of:
identifying a software agent;
in response to said identifying step, storing all requests from said identified software agent in said log file;
in response to said storing step, analysing said log file;
in response to said analysing step, monitoring behaviour of said identified software agent, and in response to said monitoring step, invoking at least one of a plurality of pre-defined rules to control said behaviour of said identified software agent, wherein
said at least one of a plurality of pre-defined rules controls a plurality of thread priorities associated with said server, wherein
at least one of a plurality of threads is associated with a software agent.

* * * * *